United States Patent [19]

Saito

[11] Patent Number: 4,912,774
[45] Date of Patent: Mar. 27, 1990

[54] INSTANTANEOUS VOLTAGE DROP DETECTOR

[75] Inventor: Akio Saito, Tokyo, Japan

[73] Assignee: NEC Corporation, Japan

[21] Appl. No.: 158,610

[22] Filed: Feb. 22, 1988

[30] Foreign Application Priority Data

Feb. 23, 1987 [JP] Japan ............................. 62-25058[U]

[51] Int. Cl.⁴ ............................................ H01Q 11/12
[52] U.S. Cl. .................................... 455/117; 455/127; 455/343
[58] Field of Search ............... 455/343, 117, 127, 214, 455/226

[56] References Cited

U.S. PATENT DOCUMENTS 4,761,824  8/1988  Saito ..................................... 455/117
4,766,580  8/1988  Go et al. ............................. 455/127

Primary Examiner—Joseph A. Orsino
Assistant Examiner—Frank M. Scutch, III
Attorney, Agent, or Firm—Laff, Whitesell, Conte & Saret

[57] ABSTRACT

An instantaneous voltage drop detector that comprises a power supply for a utilization circuit such as a mobile telephone. A first detector detects a drop in an output voltage of the power supply that falls below a first predetermined level. A second detector determines whether the first detection signal continues for more than a predetermined time. A control circuit responds to the first and second detection signals for controlling the utilization circuit.

7 Claims, 3 Drawing Sheets

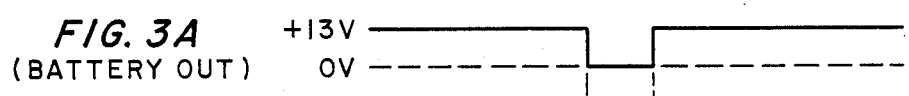
FIG. 3A (BATTERY OUT)
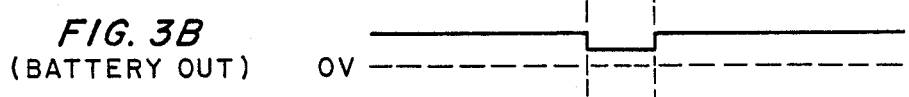
FIG. 3B (BATTERY OUT)
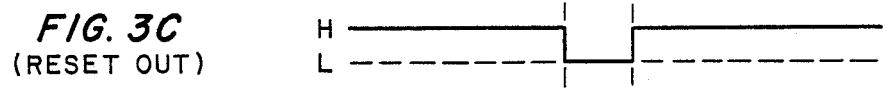
FIG. 3C (RESET OUT)
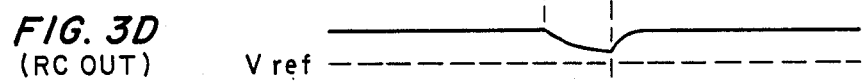
FIG. 3D (RC OUT)
FIG. 3E (I/O OUT)
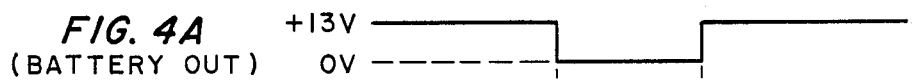
FIG. 4A (BATTERY OUT)
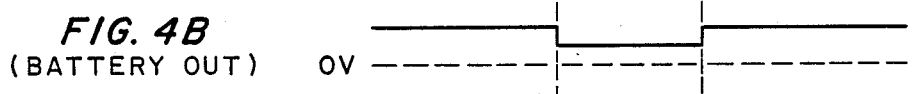
FIG. 4B (BATTERY OUT)
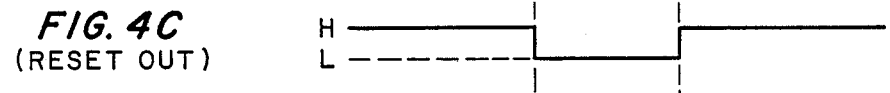
FIG. 4C (RESET OUT)
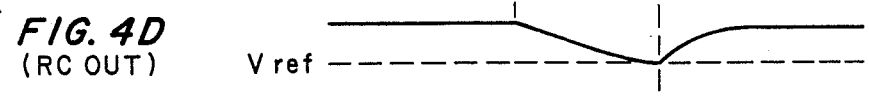
FIG. 4D (RC OUT)
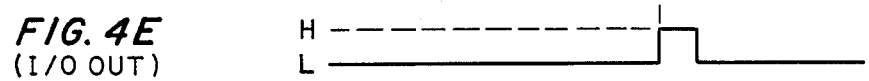
FIG. 4E (I/O OUT)

INSTANTANEOUS VOLTAGE DROP DETECTOR

BACKGROUND OF THE INVENTION

The present invention relates to an instantaneous voltage drop detector, and more particularly to a detector for detecting an instantaneous voltage drop in a battery used for a mobile radiotelephone and the like.

A mobile radiotelephone may experience a voltage drop which occurs in a battery supplying power during a telephone conversation, whereby its transmitter/receiver section may be controlled during on the period of voltage drop. More specifically, if the battery voltage is restored to a normal level within a predetermined period of time, for example, three seconds from the voltage drop, the transmitter/receiver section is not controlled and the telephone conversation is maintained. On the other hand, if the normal voltage level is restored more than three seconds after the voltage drop, the telephone is automatically returned to the waiting state. Unless the normal voltage level is restored even after the lapse of three seconds from the voltage drop, the mobile radiotelephone stays in an inoperable state.

In a conventional instantaneous voltage drop detector used for the mobile radiotelephone, the battery output is supplied to a reset circuit and to a regulator, respectively wherein the output is connected to an RC time constant circuit. During a telephone conversation, the outputs from the reset circuit and the RC time constant circuit are used for logically judging whether the radiotelephone should maintain the conversation or should shift to the waiting state. The RC time constant circuit provides a time, e.g., three seconds to make this judgment.

However, the conventional instantaneous voltage drop detector is inconvenient in that a detection delay occurs while the regulator output is being used for making the above-mentioned judgment. Moreover, when the battery output voltage is lowered to the median voltage level, between the uppermost and lowermost levels, the detector often cannot detect such a drop due to the effect of the RC time constant circuit connected to the regulator output. Therefore, the conventional detector cannot correctly detect the instantaneous voltage drop.

SUMMARY OF THE INVENTION

An object of the present invention is to provide an instantaneous voltage drop detector that detects voltage drop with substantially no delay and does not require an additional circuit element.

Another object of this invention is to provide an instantaneous voltage drop detector which can detect an instantaneous voltage drop even when a voltage drop due to the failure falls only slightly below a median voltage level.

The present invention provides an instantaneous voltage drop detector comprising power supply means for supplying power to a utilization circuit. A first detector detects a drop in an output voltage of the power supply means which falls below a first predetermined level, and supplies a first detection signal having a second predetermined level which is different from the first predetermined level. A second detector judges whether or not the first detection signal continues for more than a predetermined time period for producing a second detection signal if it continues beyond the predetermined time period. A control means is responsive to the first and second detection signals for controlling the utilization circuit.

BRIEF DESCRIPTION OF THE DRAWINGS

The present invention will be described in further detail below with reference to the accompanying drawings, in which:

FIGS. 3A to 3E and 4A to 4E are time charts showing waveforms at various sections of the detector shown in FIG. 1.

DETAILED DESCRIPTION OF THE PREFERRED EMBODIMENT

Figure 1:
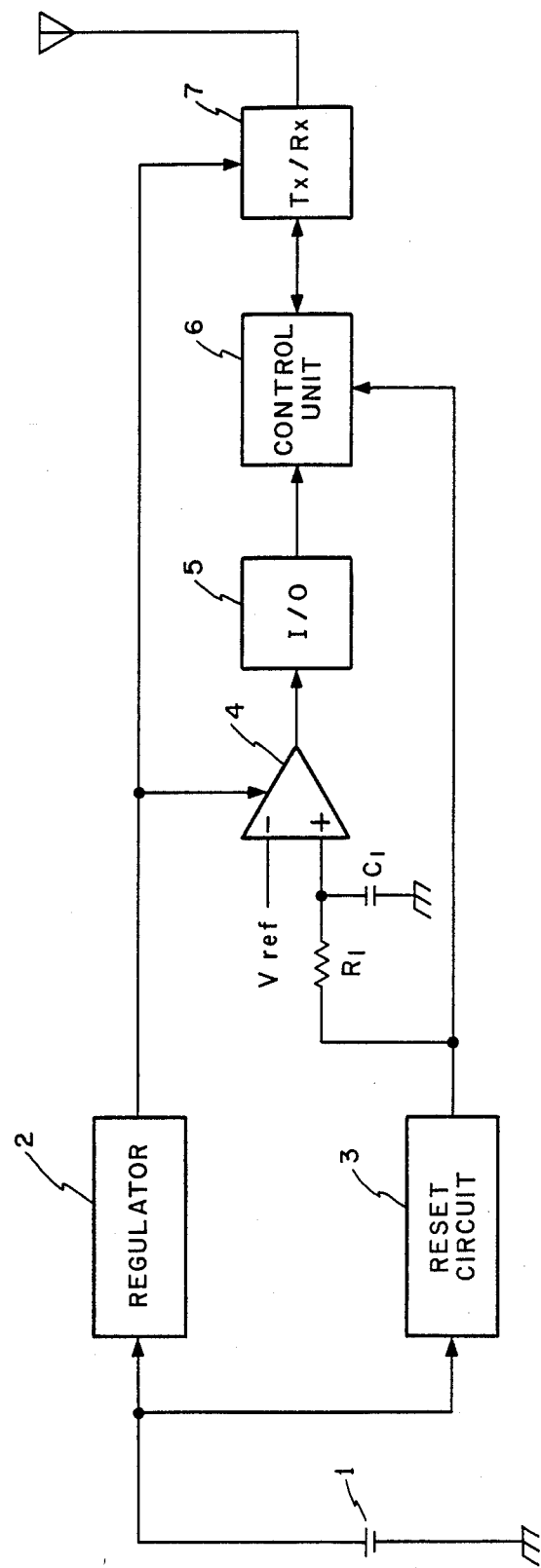
FIG. 1 is a block diagram showing an embodiment of an instantaneous voltage drop detector according to this invention.

In FIG. 1, an output voltage from a battery 1 (for example +13 V) is regulated to be at a predetermined level (for instance +6 V) by a regulator 2, and is supplied to a comparator 4 and a transmitter/receiver (TX/RX) 7. The TX/RX 7 includes a handset unit (not shown). The output voltage from the battery 1 is also supplied to a reset circuit 3. The reset circuit 3 can detect not only a voltage drop to the lowermost level, i.e., zero volts, but also a drop to a median level from the output of the battery 1. The output level of battery 1 changes from high to low when the reset circuit 3 detects such drops.

When the output voltage from the battery 1 has been restored to the normal level, the reset circuit 3 changes its output level from low to high. The output from the reset circuit 3 is supplied to a control unit 6 for making a logical judgement in order to control the TX/RX 7 and the comparator 4 after the voltage drop. Comparator 4 is controlled through a CR time constant circuit comprising a capacitor $C_1$ and a resistor $R_1$. The CR time constant circuit provides a judgement time (three seconds in this instance) to determine whether or not the conversation should be maintained.

The comparator 4 compares an input voltage applied thereto with a predetermined reference level Vref, and supplies an output voltage to an input/output (I/O) port when the input voltage exceeds Vref. The I/O port 5 supplies a high-level signal when it receives an input voltage and a low-level signal when it receives no input voltage, the signal being supplied to the control unit 6. Based on the outputs from the reset circuit 3 and the I/O port 5 during the conversation, the control unit 6 logically judges whether the TX/RX 7 should be maintained at the present conversation mode or shifted to the waiting mode. The logical judgment will be described in more detail later, referring to FIG. 5.

Figure 2:
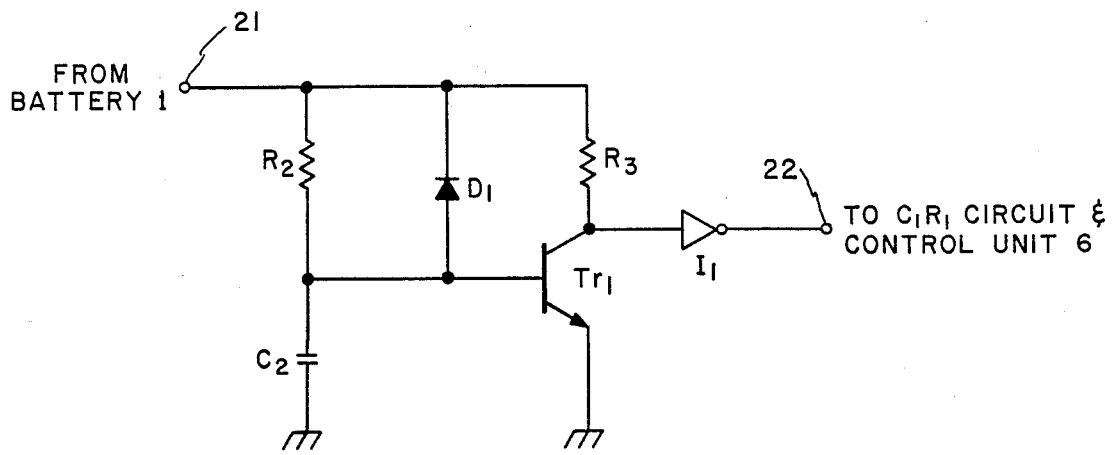
FIG. 2 is a circuit showing a reset circuit in the detector shown in FIG. 1.

FIG. 2 is a circuit showing the reset circuit 3 shown in FIG. 1. The battery output voltage is supplied through an input terminal 21 to a CR time constant circuit comprising a capacitor $C_2$ and a resistor $R_2$. The battery output voltage is also supplied to a resistor $R_3$ and a diode $D_1$ which are connected between a base and a collector of a switching transistor $Tr_1$. The detectable level in battery voltage drop can be determined by the voltage between the base and the emitter of the transistor $Tr_1$. The detectable level represents a median level somewhere between the uppermost and lowermost voltages of battery 1. The CR time constant circuit absorbs minute fluctuations in input voltages. The reset output is obtained from a terminal 22 via an inverter I₁ which is connected to the collector of the transistor Tr₁.

If a circuit is added which changes the voltage between the base and emitter of the transistor Tr₁ (not shown), the detectable level may be changed.

FIGS. 3A to 3E and 4A to 4E are time charts showing waveforms at various sections in the detector of FIG. 1, and are representative of power failures which continue for a predetermined time period (three seconds here) or less.

The cases where the battery output voltage drops to the zero-volt (0 V) level within three seconds, as shown in FIG. 3A, or where it drops to the median level within three seconds, as shown in FIG. 3B, the output from the reset circuit 3 is changed from a high level to a low level and then back to a high level, as shown in FIG. 3C. In other words, the circuit 3 produces a reset output. The output from the RC time constant circuit becomes a waveform due to the time constant thereof, as shown in FIG. 3D, and does not drop below the predetermined rererence level Vref. Therefore, the output from the I/O port 5 stays at a low level as shown in FIG. 3E.

When the voltage drop continues for more than three seconds, for example, where the voltage drops to the 0 V level or to the median level, as shown respectively in FIGS. 4A and 4B, the output from the reset circuit 3 shifts from the high level to the low level and then back to the high level. In other words, it supplies a reset output. The output from the RC time constant circuit becomes a waveform as shown in FIG. 4D due to the time constant thereof. When the output drops below the predetermined reference level Vref, the I/O port 5 outputs a high level pulse, as shown in FIG. 4E.

In the reset circuit 3 of FIG. 2, when the input voltage supplied at the terminal 21 drops to the 0 V level, as shown in FIGS. 3A and 4A, the reset output is naturally obtained from the terminal 22, as shown in FIGS. 3C and 4C. When the input voltage lowers to the median voltage level as shown in FIGS. 3B and 4B, the reset output as shown in FIGS. 3C and 4C can be obtained from terminal 22 if it is above the threshold level between the base and the emitter of the transistor Tr₁.

As mentioned in the foregoing specification, the detector of the present invention involves no delay in detection from the start of the drop of the battery output voltage. The present detector can also detect a power drop to only a median level.

The operation of a control unit 6 during the conversation will now be described, referring to the flowchart of FIG. 5. The conversation state is maintained during an instantaneous power failure of less than three seconds, but the mode enters the waiting state if the voltage is restored after three seconds.

Figure 5:
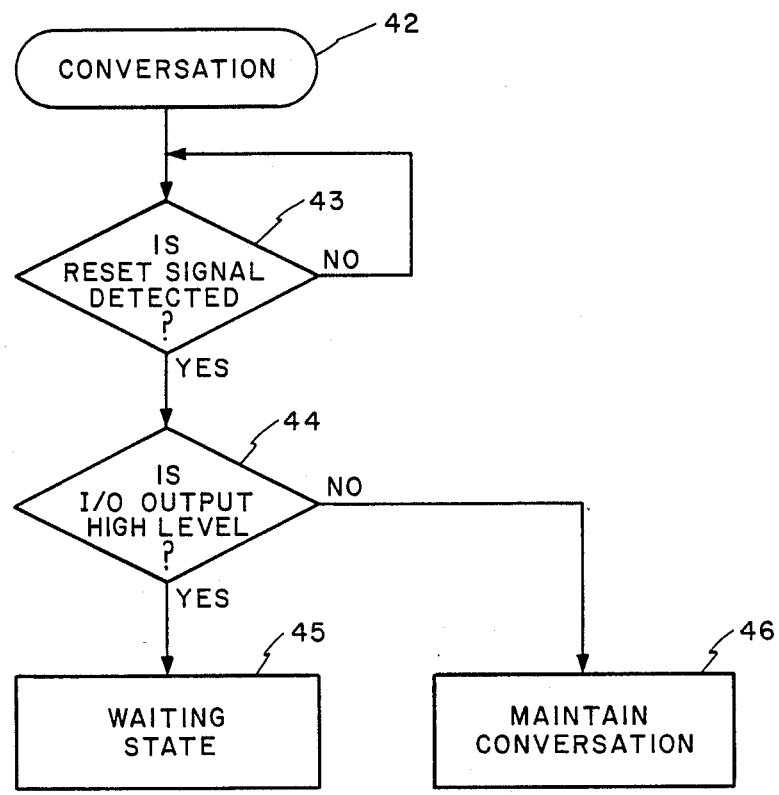
FIG. 5 is a flowchart showing the operation of a control unit of the detector shown in FIG. 1.

In FIG. 5, unless a reset output from the reset circuit 3 is made at Step 43, during the conversation (Step 42), the process does not proceed to the next step. The absence of a reset output means either that the battery output is normal or that the power is cut off, and further indicates that there is no necessity of control. When a reset output is detected at Step 43, the output from the I/O port 5 is judged as to whether it is or is not at a high level, at Step 44. If it is at the high level, it means that the voltage is restored to the normal voltage after three seconds. Thus, the TX/RX 7 is regulated to enter the waiting stage at Step 45. If it is not at the high level, it means that the power drop is restored within three seconds, and the TX/RX 7 is regulated to maintain the current speech state at Step 46.

As described in detail above, according to the instantaneous voltage drop detector of the present invention, a regulator output is not used fo detection of voltage drop. Moreover the battery voltage drops can be detected without any delay from the start of actual drop. It further detects a battery voltage drop even if it does not drop to the 0 V level, but if it drops to only the median level, by directly connecting the reset circuit with the CR time constant circuit and enabling precise detection of voltage drop.

What is claimed is:

1. An instantaneous voltage drop detector comprising:

power supply means for supplying power at least to an utilization circuit;

first detecting means for detecting a drop in an output voltage of said power supply means which falls below a first predetermined level, and for supplying a first detection signal having a second predetermined level which is different from said first predetermined level;

second detecting means including an RC time constant circuit connected to the output of said first detecting means, said second detecting means having a resistor and a capacitor and being responsive to said first detection signal for producing a signal having rising and trailing edges with a time constant caused by a combination of said resistor and said capacitor, and a comparator for comparing said signal from said RC time constant circuit with a predetermined reference voltage to output a second detection signal, thereby judging whether or not said first detection signal continues for more than a predetermined time period, and for producing said second detection signal if said first detection signal continues beyond said predetermined time period; and control means responsive to said first and second detection signals for controlling said utilization circuit.

2. The instantaneous voltage drop detector of claim 1, wherein said utilization circuit comprises a transmitter/receiver.

3. The instantaneous voltage drop detector of claim 2, wherein said power supply means is comprised of a car battery.

4. The instantaneous voltage drop detector of claim 3, wherein said first detecting means is a reset circuit.

5. The instantaneous voltage drop detector of claim 1, wherein said first and second detection signals are binary signals.

6. The instantaneous voltage drop detector of claim 1, wherein said control means comprises;

first means for judging whether or not the mode of said transmitter/receiver is a conversation state;

second means responsive to the output of said first means for detecting the presence and absence of said first detection signal;

third means responsive to the presence of said first detection signal for detecting the presence and absence of said second detection signal; and fourth means for maintaining said transmitter/receiver in its conversation state in response to the absence of said second detection signal and for shifting said transmitter/receiver to its waiting state in response to the presence of said second detection signal.

7. A fast acting detector circuit for detecting fluctuations in the voltage level powering a mobile radio telephone, first means responsive to said fluctuations which reach a predetermined level for giving a first detection signal; second means including an RC time constant circuit connected to the output of said first means for measuring a predetermined period of time during which said first detection signal persists, said predetermined period being measured by the time constant of said RC time constant circuit, and third means jointly responsive to said first detector signal and to said second means for determining whether a conversation over said mobile radio telephone should be maintained.

* * * * *